Patented Nov. 16, 1948

2,453,765

UNITED STATES PATENT OFFICE 2,453,765

ALKYLATION PROCESS

Donald G. Stevens, Cleveland, Ohio, assignor to The Standard Oil Company, Cleveland, Ohio, a corporation of Ohio No Drawing. Application April 25, 1945, Serial No. 590,310

2 Claims. (Cl. 260—683.4)

This invention relates to the alkylation of isoparaffins with olefins to prepare alkylates, and more particularly, to the use of extremely high internal ratios of isoparaffin to olefin for the production of gasoline having excellent performance characteristics under rich mixture operating conditions.

In internal combustion engines which must give a very rapid pick-up, such as an airplane engine, it is highly desirable to use fuels which are especially suited for this purpose. Fuels are rated for this use by testing in a standard engine and measuring the indicated mean effective pressure (in pounds per square inch) at the point of incipient knock. This is determined by the standard method identified as AN—VV—F—748, and further reference to I. M. E. P. herein is that obtained by this standard method. This is sometimes referred to as the rich mixture rating. Methods have been proposed for converting the I. M. E. P. to various other ratings. The designation of the I. M. E. P., however, is believed to be satisfactory for indicating the desired performance characteristics of the fuel.

The reaction of lower isoparaffins with olefins to yield alkylates is known. Processes for the alkylation of isobutane with butenes using liquid sulfuric or hydrofluoric acid as a catalyst have been used commercially. However, insofar as I am aware, the known alkylation processes all give a gasoline having a relatively low rich mixture rating; and none of such processes ever indicated the possibility of achieving an internal ratio of isoparaffin to olefin of over about 200, let alone appreciating that any unusual result in rich mixture characteristics could be achieved by increasing the internal ratio. Insofar as I am aware, gasolines comprising aliphatic hydrocarbons which have a very high rich mixture rating, such as produced by my alkylation process, have been made heretofore only by more expensive processes, such as hydrogenation of certain polymers.

It has been suggested heretofore that the amount of isoparaffin in the feed should be much larger than the amount of the olefin feed in achieving the alkylation reaction. In the case of the reaction of isobutane with a butene, for instance, it has been known that the molal amount of isobutane should exceed the molal amount of butene even though the $C_8$ alkylate contains equal molal amounts of the reaction ingredients. This prior art proposal has been based on the desire that all of the butene be consumed to form $C_8$ alkylate, and to prevent the polymerization of any of the butene to a polymer or to prevent the reaction of the polymer with the isobutane to form a $C_{12}$ alkylate. While the prior art has proposed the use of a sufficient excess of the isobutane to assure that all of the butene is reacted to form $C_8$ alkylate, the prior art has not appreciated the effect of the ratios of reactants on the character of the $C_8$ alkylate formed.

Surprisingly enough indeed, it has now been discovered that if an alkylation process is conducted with an extremely high internal ratio of isoparaffin to olefin, the product which is obtained has a very high percentage of the desirable trimethyl pentanes and a very high rich mixture rating as indicated by its I. M. E. P. when tested by the standard method.

The internal ratio is the ratio of the isoparaffin to the olefin at the point of contact of the reactants and catalyst. It is a value that can be determined by anyone skilled in the art. It is calculated by taking the sum of the volume of the isoparaffin in the feed to the reactor per unit of time, plus the volume of isoparaffin in the emulsion stream recycling in the reactor per unit of time, divided by the volume of the olefin feed to the reactor per unit of time. This ratio can be brought to a very high value by recycling a relatively large amount of the emulsion in the reactor. The recycled emulsion generally is fed so that it re-enters the reactor together with the external isoparaffin feed at a zone adjacent or near the entry of the olefin feed. The recycled material contains substantially no olefin, since the reaction is believed to be substantially instantaneous. This high internal ratio of at least 1500 may be achieved with an external ratio in the range of about 5 to 100. The external ratio is the volume of the isoparaffin feed to the reactor per unit of time divided by the volume of olefin feed per unit of time.

The objects of the invention, all of which are achieved as disclosed herein, include the provision of an alkylation process which produces a motor fuel having a high rich mixture rating, the provision of a method of obtaining a high internal ratio of reactants, and other objects which will become apparent as the invention is more fully developed hereinafter.

In order to more clearly point out and illustrate the invention, but not in any sense whatsoever as a limitation thereof as otherwise disclosed herein, the following specific embodiment is included.

In an alkylation reactor equipped with an efficient agitator and emulsion recycling pumps, an emulsion of a mixture of hydrocarbons in 94.6 weight percent sulfuric acid was agitated and maintained at a temperature of 39° F., and a part of the reaction mass was continually circulated and mixed with the external isobutane feed. The measured external ratio of the external feed of isobutane to the feed of butenes was about 43.4. The internal ratio was about 1774. This value was obtained by calculation from the above measured values and the known capacity of the recirculation pump, and its measured speed of operation, and the isobutane analysis of the recirculating emulsion. The C8 alkylate obtained therefrom was tested by the standard method heretofore identified to determine its I. M. E. P. It was found to be very high, in excess of 287, and comprised 87% of the several trimethyl pentanes, by analysis, including a major portion of those having the most desirable combustion characteristics in an internal combustion engine.

In another run using the same equipment but with a lower internal ratio, namely 251, as practiced by prior art processes, the product obtained had an I. M. E. P. of 240 when similarly tested. Such gasoline effects a much lower power output than the product made in accordance with my invention when used under rich mixture conditions. Such lower value alkylation gasoline has been regarded as unsuitable for extremely high pick-up requirements. An I. M. E. P. of 240 is characteristic of prior art gasolines as is indicated by the fact that in making up a scale for conversion of I. M. E. P. readings into other types of ratings for the purpose of blending products in 100 octane gasoline, the highest I. M. E. P. included in such conversion scale was 259, and this was regarded by the art as sufficiently high to cover the motor fuels made by known processes. The new alkylation product, having an I. M. E. P. of 287 when tested by the standard procedure identified heretofore, is eminently suited for high pick-up requirements.

In practicing my process, the emulsion in the reactor should have a consistency such that it will not break or settle out during a single recycle. It should, however, settle in a reasonable time when allowed to stand, so as to permit separation of the hydrocarbons from the acid. It is preferred to operate with a so-called tight emulsion, that is, one which when poured into a beaker will not break in at least five minutes and will break in about 20 to 25 minutes standing under atmospheric conditions.

As an alkylation catalyst, a concentrated sulfuric acid catalyst is preferred, although other liquid catalysts such as anhydrous hydrofluoric acid also may be used. The preferred reaction temperatures are those usually used with the catalyst employed and would fall in the range of about 35° to about 45° F. in the case of sulfuric acid. The particular design of the reactor is immaterial, so long as it provided efficient agitation of the whole reaction mass, and it provides a recycling speed sufficient to achieve an internal ratio of at least 625.

In accordance with the invention, lower hydrocarbons containing a tertiary carbon atom may be alkylated by means of olefins to give very high rich mixture rating motor fuels. Isobutane and isopentane are the preferred tertiary carbon atom hydrocarbons; and the preferred olefins are those which will add thereto to give alkylates in the motor fuel range, that is, amylenes, butenes, propene and ethylene.

In view of the foregoing disclosure, variations and modifications thereof will be apparent to one skilled in the art. The invention includes all such variations and modifications that come within the scope of the appended claims.

I claim:

1. The process of producing a high rich mixture rating motor fuel, a very high percentage of which consists of trimethyl pentanes, which process comprises continuously treating isobutane with a butene in the presence of a liquid acid alkylation catalyst under alkylating conditions while continuously recycling a relatively large part of the isobutane in an isobutane-acid emulsion so that it re-enters the reaction zone near the entry of the butene and isobutane feed, the rate of recycling of the reaction mixture being such that the sum of the volume of the isobutane in the feed per unit time plus the volume of isobutane being recycled per unit time divided by the volume of the butene feed to the reaction zone per unit time is continuously at least 1500.

2. The process of producing a high rich mixture rating motor fuel, about 87% of which consists of trimethyl pentanes, which process comprises continuously treating isobutane with a butene in the presence of a concentrated sulfuric acid alkylation catalyst at a temperature in the range of 35° to 45° F. while continuously recycling a relatively large part of the isobutane in an isobutane-acid emulsion so that it re-enters the reaction zone near the entry of the butene and isobutane feed, the rate of recycling of the reaction mixture being such that the sum of the volume of the isobutane in the feed per unit time plus the volume of isobutane being recycled per unit time divided by the volume of the butene feed to the reaction zone per unit time is continuously about 1774.

DONALD G. STEVENS.

REFERENCES CITED

The following references are of record in the file of this patent:

UNITED STATES PATENTS

| Number | Name | Date |
|---|---|---|
| 2,238,802 | Altshuler et al. | Apr. 15, 1941 |
| 2,245,038 | Holm et al. | June 10, 1941 |
| 2,260,945 | Korpi et al. | Oct. 28, 1941 |
| 2,359,542 | Bradley et al. | Oct. 3, 1944 |

FOREIGN PATENTS

| Number | Country | Date |
|---|---|---|
| 377,838 | Italy | Jan. 10, 1940 |